United States Patent
Moorhouse et al.

(10) Patent No.: US 6,737,386 B1
(45) Date of Patent: May 18, 2004

(54) AQUEOUS BASED ZIRCONIUM (IV) CROSSLINKED GUAR FRACTURING FLUID AND A METHOD OF MAKING AND USE THEREFOR

(75) Inventors: Ralph Moorhouse, Houston, TX (US); Lester E. Matthews, Midland, TX (US)

(73) Assignee: Benchmark Research and Technology Inc., Midland, TX (US)

( * ) Notice: Subject to any disclaimer, the term of this patent is extended or adjusted under 35 U.S.C. 154(b) by 0 days.

(21) Appl. No.: 09/579,658

(22) Filed: May 26, 2000

Related U.S. Application Data

(60) Provisional application No. 60/136,102, filed on May 26, 1999.

(51) Int. Cl.[7] .............................. C09K 3/00; E21B 43/26
(52) U.S. Cl. .................. 507/211; 507/209; 507/271; 507/266; 507/267; 507/922; 166/308
(58) Field of Search .............................. 507/209, 211, 507/271, 922, 266, 267; 166/308

(56) References Cited

U.S. PATENT DOCUMENTS

| | | | | |
|---|---|---|---|---|
| 4,460,751 A | * | 7/1984 | Hanlon ........................ 507/211 |
| 4,524,829 A | * | 6/1985 | Hanlon et al. ............... 166/294 |
| 4,784,694 A | * | 11/1988 | Lemanczyk et al. ........ 507/211 |
| 4,797,216 A | * | 1/1989 | Hodge ......................... 166/308 |
| 4,801,389 A | * | 1/1989 | Brannon et al. ............. 166/308 |
| 4,960,527 A | * | 10/1990 | Penny .......................... 507/211 |
| 4,961,466 A | * | 10/1990 | Himes et al. ................ 166/308 |
| 5,143,157 A | * | 9/1992 | Harms ......................... 166/308 |
| 5,165,479 A | * | 11/1992 | Harris et al. ................. 507/271 |
| 5,322,123 A | * | 6/1994 | Kohler et al. ................ 507/271 |
| 5,614,475 A | * | 3/1997 | Moorhouse ................... 507/271 |
| 5,624,886 A | * | 4/1997 | Dawson et al. .............. 507/921 |
| 5,798,320 A | * | 8/1998 | Dawson ........................ 507/271 |
| 6,165,947 A | * | 12/2000 | Chang et al. ................ 507/271 |

\* cited by examiner

*Primary Examiner*—Philip C. Tucker
(74) *Attorney, Agent, or Firm*—Christopher L. Makay

(57) ABSTRACT

A high temperture aqueous based zirconium (IV) crosslinked guar fracturing fluid having a pH from about 9 to about 12 includes a polymer solution and a zirconium (IV) crosslinking agent in an amount from about 0.1 PPTG to about 5 PPTG of the polymer solution. The polymer solution includes an aqueous fluid, natural guar gum in an amount from about 10 PPTG to about 100 PPTG of the aqueous fluid, a stabilizer in an amount from about 1 PPTG to about 50 PPTG of the aqueous fluid, a non-delayed alkaline buffer in an amount from about 1 PPTG to about 40 PPTG of the aqueous fluid, and a gelation delaying agent in an amount from about 0.25 PPTG to about 3.75 PPTG of the aqueous fluid, where those agents are combined to produce a fracturing fluid suitable to the purposes of hydraulically fracturing subterranean formations with static bottom-hole temperatures greater than 250° F.

60 Claims, No Drawings

AQUEOUS BASED ZIRCONIUM (IV) CROSSLINKED GUAR FRACTURING FLUID AND A METHOD OF MAKING AND USE THEREFOR

This application claims the benefit of provisional application No. 60/136,102 filed May 26, 1999.

BACKGROUND OF THE INVENTION

1. Field of the Invention

The present invention generally relates to fracturing fluids and, more particularly, but not by way of limitation, to an aqueous based zirconium (IV) crosslinked guar fracturing fluid and a method of making and use therefor, suitable to the purposes of hydraulically fracturing subterranean formations having static bottom-hole temperatures greater than about 250° F.

2. Description of the Related Art

An aqueous based crosslinked polygalactomannan fluid is typically used to perform a hydraulic fracturing treatment of a hydrocarbon bearing reservoir when the static bottom-hole temperature of a well exceeds approximately 250° F.

One type of aqueous based crosslinked polygalactomannan fluid that might be used in high temperature wells are borate crosslinked guar fluids, where the pH of the crosslinked fluid under treating conditions ranges from about 8.5 to about 12. Typical borate crosslinked guar fluids include, but are not limited to, those described in U.S. Pat. No. 5,145,590 (Dawson), U.S. Pat. No. 5,445,223 (Nelson et al), and in "Chemistry & Rheology of Borate-Crosslinked Fluids at Temperatures to 300° F., P.C. Harris, J. Petroleum Technology, March 1993, pp. 264–269.

A second type of aqueous based crosslinked polygalactomannan fluid that might be used in fracturing high temperature wells are titanium (IV) or zirconium (IV) crosslinked derivatized guar fluids where the pH of the crosslinked fluid under treating conditions may range from about 3.5 to about 11. Typical derivatized guar polymers suitable to formulate a titanium (IV) or a zirconium (IV) crosslinked derivatized guar fluid include but are not limited to, alkyl-derivatives, such as hydroxypropyl guar (HPG), carboxyalkyl-derivatives, such as carboxymethyl guar (CMG), and carboxyalkyl-hydroxyalkyl-derivatives, such as carboxymethylhydroxypropyl guar (CMHPG). The guar used in the high temperature borate fracturing fluids is distinguishable from the derivatized guar used in the zirconium (IV) or titanium (IV) high temperature crosslinked fracturing fluid, in that guar for the borate crosslinked fluid is not subjected to a chemical treatment wherein some form of molecular substitution, such as alkylation, carboxylation or combinations thereof, has been performed to derivatize the guar. Typical titanium (IV) or zirconium (IV) crosslinked derivatized guar fluids include but are not limited to, those described in U.S. Pat. No. 3,888,312 (Tiner et al.), U.S. Pat. No. 4,534,870 (Williams), U.S. Pat. No. 4,686,052 (Baranet et al.), and U.S. Pat. No. 4,799,550 (Harris et al.)

In hydraulically fracturing a hydrocarbon bearing reservoir with an aqueous based crosslinked guar or derivatized guar fracturing fluid, it is often necessary that the aqueous based crosslinked guar or derivatized guar fracturing fluid exhibit more than an hour of stability. Those of ordinary skill in the art generally regard stability as a minimum viscosity achieved based upon an agreed rheological test method for an agreed period of time. The agreed rheological test method may be one proposed by the American Petroleum Institute (API) or an adaptation of an API method as proposed by a petroleum production company or its hydraulic fracturing service provider. Alternatively, the agreed rheological test method may be a novel method proposed and mutually agreed upon by the participants in the hydraulic fracturing fluid evaluation and may follow a regime based upon anticipated field conditions.

A borate crosslinked guar fracturing fluid is typically used when bottom-hole temperatures (BHT's) of a well do not exceed about 325° F. and where more than an hour of stability is necessary. A borate crosslinked guar fracturing fluid is generally made more stable by raising the pH of the fracturing fluid, increasing the borate concentration, or increasing the guar concentration in solution. A problem experienced in stabilizing the high temperature borate crosslinked fracturing fluid by raising the pH of the fluid, increasing the borate concentration, or increasing the guar concentration in solution is that pH, borate concentration, or guar concentration can be excessive, any of which may render the fracturing fluid unsuitable for use in the intended hydraulic fracturing treatment of a hydrocarbon bearing reservoir. Increasing chemical constituent loading to accommodate wells with higher BHT's is also more costly.

A zirconium (IV) crosslinked derivatized guar fracturing fluid is typically used when the BHT of a well does not exceed about 400° F. and where more than an hour of stability is necessary. A zirconium (IV) crosslinked derivatized guar fracturing fluid is generally made more stable by raising the pH of the fracturing fluid, increasing the zirconium (IV) concentration, or increasing the derivatized guar concentration in solution. A problem experienced in stabilizing the high temperature zirconium (IV) crosslinked fracturing fluid by raising the pH of the fluid, increasing the zirconium (IV) concentration, or increasing the derivatized guar concentration in solution is that pH, zirconium (IV) concentration, or derivatized guar concentration can be excessive, any of which may render the fracturing fluid unsuitable for use in the intended hydraulic fracturing treatment of a hydrocarbon bearing reservoir. Likewise, as is the case of borate crosslinked fluids, increasing chemical constituent loading to accommodate wells with higher BHT's is also more costly.

A zirconium (IV) crosslinked derivatized guar fracturing fluid provides certain advantages over a borate crosslinked guar fracturing fluid, especially when BHT of a well exceeds about 325° F. At BHT's less than about 250° F., a zirconium (IV) crosslinked derivatized guar fracturing fluid is usable at a pH of less than about 8.5, which is particularly advantageous if carbon dioxide comprises a portion of the fracturing fluid because the pH of the fracturing fluid may be as low as 3.5. Also, at BHT's greater than about 250° F., and certainly as BHT's increase above about 325° F., it is much easier and less costly to delay the gelation of a zirconium (IV) crosslinked derivatized guar fracturing fluid than a borate crosslinked guar fracturing fluid.

Although a zirconium (IV) crosslinked derivatized guar fracturing fluid provides certain operational advantages over a borate crosslinked guar fracturing fluid, a borate crosslinked guar fracturing fluid provides the advantage that it employs guar, which is less costly and more readily available than derivatized guar, and borate crosslinked guar fracturing fluids have historically been shown to operate to temperatures approximately 50° F. higher than zirconium (IV) crosslinked guar fracturing fluids. Consequently, a zirconium (IV) crosslinked guar fracturing fluid is typically not suitable for hydraulic fracturing treatments where the BHT of a well exceeds about 275° F. In those instances where a zirconium (IV) crosslinked guar fracturing fluid may be utilized where the BHT of a well exceeds 275° F., the zirconium (IV) crosslinked guar fracturing fluid requires guar loadings in excess of 50 pounds of guar per 1000 gallons of make-up water and may often require as much as 80 pounds of guar per 1000 gallons of make-up water before a stable fracturing fluid is achieved. When such guar loadings are necessary, derivatized guar is utilized because, although it is more expensive, the derivatized guar requires considerably lower loading levels, and by virtue of the lower polymer loading, the spent fracturing fluid is easier to recover following the fracturing treatment.

Brannon et aL (U.S. Pat. No. 4,801,389) describe partially successful attempts to develop a zirconium (IV) crosslinked guar fracturing fluid for high temperature applications. Brannon et al. teaches to a fracturing fluid pH of about 8 to about 10. Any greater pH in this method tends to accelerate the crosslink rate thereby negating the benefit of delayed crosslinking on the subsequent rheological performance reported for the crosslinked fluid. Thus Brannon et al. were constrained to using sodium bicarbonate only as a buffering agent. This results in the disadvantage that the fluid has a lower pH than a fluid made with the corresponding carbonate. Additionally, the quantity of bicarbonate causes the onset of crosslinking to be substantially delayed whereas the presence of carbonate does not cause a substantial delay. This reduces the flexibility of the fluid since typically it is desirable to be able to vary the crosslink time of fracturing fluids. More flexibility in the control of crosslink time can be available with a blended buffer of bicarbonate and carbonate, where the overall bicarbonate loading can be varied. Furthermore, it is recognized that a greater pH, to pH 12 or higher, may substantially improve the rheological performance of this fluid. Because of the use of bicarbonate alone to control the crosslinking rate does not allow for the fluid pH to rise much above 9, fluids with bicarbonate buffering alone are not suitable for very high temperature wells. Additionally, Brannon et al. is apparently limited to a rheological performance ($\geq$100 cP) of about 0.75 hrs at 325° F., whereas most fracturing fluid treatments at this elevated temperature require >2 hrs performance at $\geq$100 cP. Accordingly, there is a recognized and long felt need for a stable zirconium (IV) crosslinked fracturing fluid formulated utilizing guar at loadings at least comparable to the loadings of derivatized guar in a zirconium (IV) crosslinked derivatized guar fracturing fluid and utilizing a crosslinking delay agent that is not constrained by the pH of the buffer used.

SUMMARY OF THE INVENTION

In accordance with the present invention, an aqueous based zirconium (IV) crosslinked guar fracturing fluid having a pH from about 9 to about 12 includes a polymer solution and a zirconium (IV) crosslinking agent in an amount from about 0.1 gallons per thousand gallons(GPTG) to about 5 GPTG of the polymer solution. The polymer solution includes an aqueous fluid, natural guar gum in an amount from about 10 pounds per thousand gallons(PPTG) to about 100 PPTG of the aqueous fluid, a stabilizer in an amount from about 1 PPTG to about 50 PPTG of the aqueous fluid, a alkaline buffer in an amount from about 1 PPTG to about 40 PPTG of the aqueous fluid, and an alpha-hydroxycarboxylic acid delaying agent in an amount from about 0.25 PPTG to about 3.75 PPTG of the aqueous fluid. This crosslinker is typically applied as an aqueous or alcohol solution of the metal.

The aqueous fluid includes substantially any aqueous fluid that does not adversely react with one of the constituents of the fracturing fluid, the subterranean formation, and the fluids present therein. The aqueous fluid is selected from the group consisting of fresh water, natural brines, and artificial brines, such as potassium chloride solutions and sodium chlorides solutions.

The stabilizer includes any free-radical-scavenging compound and is selected from the group consisting of sodium thiosulfate, thiourea, urea, sodium sulfite, and methanol. The pH buffer includes one or more alkaline compounds selected from the group consisting of amines, or ammonium/amine, or alkali metal hydroxides, carbonates, and bicarbonates, such as ammonium hydroxide, potassium carbonate, and sodium bicarbonate, and thioethanolamine.

The delaying agent includes an alpha-hydroxycarboxylic acid selected from the group consisting of citric acid, malic acid, glycolic acid, lactic acid, tartaric acid, gluconic acid, glyceric acid, and mandelic acid. The delaying agent further includes an ammonium, amine, or alkali metal salt of an alpha-hydroxycarboxylic acid, such as sodium citrate and ammonium lactate.

The use of a combination of buffers together with the use of an alpha-hydroxycarboxylic acid or its salt, offers an advantage over Brannon et al., (U.S. Pat. No. 4,801,389) in that the crosslink delay time of the newly proposed fluid, is controllable over a wider pH range.

The zirconium (IV) crosslinking agent includes any zirconium compound or mixture of zirconium (IV) compounds, capable of solubilizing in an aqueous polymer solution to release the metal so that gelation takes place under controlled conditions. The zirconium (IV) crosslinking agent is selected from the group consisting of aqueous or alcohol solutions of complexes of alpha-hydroxycarboxylic acids, monoalkylamine zirconium compounds, dialkylamine zirconium compounds, trialkylamine zirconium compounds, and zirconium alkanolamine complexes. More precisely, the zirconium (IV) crosslinking agent may be selected from the group consisting of zirconium ammonium lactate, zirconium di or tri ethanolamine lactate, zirconium diisopropylamine lactate, zirconium sodium lactate salts, zirconium citrate, zirconium tartate, and zirconium glycolate, and like complexes, and mixtures thereof.

In a method for formulating an aqueous based zirconium (IV) crosslinked guar fracturing fluid having a pH from about 9 to about 12, an aqueous fluid is placed into a suitable mixing device. A stabilizer is added to the aqueous fluid in an amount from about 1 PPTG to about 50 PPTG of the aqueous fluid and allowed to dissolve into the aqueous fluid for a first predetermined period. Natural guar gum is added to the mixture in an amount from about 10 PPTG to about 100 PPTG of the aqueous fluid, and the mixture is mixed for a second predetermined period. An alkaline buffer is added to the mixture in an amount from about 1 PPTG to about 40 PPTG of the aqueous fluid, and the mixture is mixed for a third predetermined period. An alpha-hydroxycarboxylic acid delaying agent is added to the mixture in an amount from about 0.25 PPTG to about 3.75 PPTG of the aqueous fluid, and the mixture is mixed for a fourth predetermined period, thereby forming a polymer solution. A zirconium (IV) crosslinking agent is added in an amount from about 0.1 GPTG to about 5 GPTG of the formulated polymer solution, and mixing is performed until gelation occurs, thereby producing the fracturing fluid.

In a method of hydraulically fracturing a subterranean zone penetrated by a wellbore, an aqueous based zirconium (IV) crosslinked guar fracturing fluid having a pH from about 9 to about 12 is prepared. The fracturing fluid is pumped into the subterranean zone via the wellbore and permitted to gel after having substantially traversed the well bore or after having entered the subterranean formation, thereby causing hydraulic fracturing of the subterranean formation. Proppants may be added to the fracturing fluid, which is utilized to disperse the proppants throughout the subterranean formation. A breaker may be added to the fracturing fluid to permit the removal of the fracturing fluid from the subterranean formation.

It is therefore an object of the present invention to provide an aqueous based zirconium (IV) crosslinked guar fracturing fluid formulated utilizing guar at loadings at least comparable to the loadings of derivatized guar in a zirconium (IV) crosslinked derivatized guar fracturing fluid.

Still other objects, features, and advantages of the present invention will become evident to those of ordinary skill in the art in light of the following.

DETAILED DESCRIPTION OF THE PREFERRED EMBODIMENT

The preferred embodiment relates to an aqueous based zirconium (IV) crosslinked guar fracturing fluid and method of making and use therefor. The aqueous based zirconium (IV) crosslinked guar fracturing fluid includes an aqueous fluid, a gelling agent, a stabilizer, an alkaline buffer, an alpha-hydroxycarboxylic acid delaying agent, and a zirconium (IV) crosslinking agent. The gelling agent, stabilizer, alkaline buffer, and alpha-hydroxycarboxylic acid delaying agent form a polymer solution, and the zirconium (IV) crosslinking agent is added to the polymer solution, thereby producing the fracturing fluid. Although not necessary, the fracturing fluid may contain additives well-known to those of ordinary skill in the art, such as potassium chloride, other clay stabilizers, foamers, salts, buffers, breakers, de-mulsifiers, surfactants, and the like.

The aqueous fluid includes substantially any aqueous fluid that does not adversely react with the constituents of the fracturing fluid, the subterranean formation, or the fluids present therein. The aqueous fluid can include, for example, fresh water, natural brines, or artificial brines, such as potassium chloride solutions, sodium chlorides solutions, and the like.

The gelling agent used in this preferred embodiment is based on polygalactomannans that are commonly found in the endosperm of certain seeds of the plant family "Leguminosae", such as the seeds of guar, locust bean, honey locust, flame tree, and the like. The form for utilization in this preferred embodiment is as purified or unpurified ground endosperm (see U.S. Pat. Nos. 2,891,050; 3,455,899; and 4,031,306), commonly known as natural guar gum. "Natural" indicates that the galactomannan has not undergone any chemical derivatization, such as the addition of hydroxyalkyl and/or carboxyalkyl groups. The guar is added during the formulation of the fracturing fluid as either a powder or a powder suspended in a solvent, such as diesel, mineral oils, or other fluids well known to those of ordinary skill in the art, thereby forming a homogenous polymer solution. The preferred natural guar is utilized in amounts in a range from about 10 to about 100 pounds per 1000 gallons (PPTG) of the aqueous fluid, preferably 40 to 60 PPTG, and most preferably 50 to 55 PPTG.

The stabilizer used in this preferred embodiment may be any free-radical-scavenging compound well known to those of ordinary skill in the art, such as sodium thiosulfate, thiourea, urea, sodium sulfite, methanol, and the like. Sodium thiosulfate is the stabilizer preferred in formulating the fracturing fluid and is used in an amount in a range from about 1 to about 50 PPTG (as sodium thiosulfate pentahydrate) of the aqueous fluid. Preferred amounts are about 20 to about 40 PPTG and most preferred is about 25 to about 30 PPTG.

The fracturing fluid includes an alkaline buffer to raise the pH of the fluid to between about pH 9 and about pH 12, preferably between about pH 9 and about 10.5, and more preferably between about pH 9.5 and about pH 10. Compounds commonly known to those of ordinary skill in the art can be used for this purpose. Typically these would include alkaline compounds comprising one or more of the group of alkaline metal hydroxides, carbonates, and bicarbonates that include, but are not limited to, sodium hydroxide, sodium carbonate, and sodium bicarbonate or blends thereof. The alkaline buffer, preferably a carbonate/bicarbonate blend, is used in an amount in a range from about 1 to about 40 PPTG of the aqueous fluid, preferably about 5 PPTG to about 30 PPTG, and most preferably about 20 to 25 PPTG. The carbonate/bicarbonate blend may vary in relative concentration from 20% to 80% of either constituent with the remainder being represented by the other constituent.

The fracturing fluid includes a delaying agent, such as an alpha-hydroxycarboxylic acid or the ammonium, amine, or alkali metal salt of the alpha-hydroxycarboxylic acid in an amount from about 0.25 to about 3.75 PPTG of the aqueous fluid, preferably between about 0.5 and about 2.5 PPTG, and most preferably between about 1 and about 1.75 PPTG. The alpha-hydroxycarboxylic acid may include, but is not limited to, citric acid, malic acid, glycolic acid, lactic acid, tartaric acid, gluconic acid, glyceric acid, mandelic acid, and the like. Ammonium, amine, or alkali metal salts of the aforementioned acids may include, but are not limited to sodium citrate, ammonium lactate, and the like. Citric acid or a salt of a citric acid is the delaying agent preferred in formulating the fracturing fluid.

Crosslinking agents useful herein can include transition metal compounds, especially zirconium and titanium. Preferred crosslinking agents include those with zirconium in the +4 oxidation state and are referred to as zirconium (IV) salts, complexes, or chelates. The fracturing fluid includes a zirconium (IV) crosslinker in an amount from about 0.1 to about 5 GPTG of the formulated polymer solution. The zirconium (IV) crosslinker may be any zirconium compound capable of solubilizing in an aqueous polymer solution to release the metal so that gelation takes place under controlled conditions (i.e., not instantaneous). Zirconium aqueous compounds suitable for formulating the aqueous based zirconium (IV) crosslinked guar fracturing fluid include, but are not limited to, zirconium lactate or a complex of zirconium and a alpha-hydroxycarboxylic acid. Suitable zirconium lactates include but are not limited to zirconium ammonium lactate, zirconium di or tri ethanolamine lactate, zirconium diisopropylamine lactate, and zirconium sodium lactate salts. It is well know to those of ordinary skill in the art that other alpha-hydroxycarboxylic acid complexes or chelates with zirconium can be produced, and by reference, such complexes or chelates are included in this art; examples include zirconium citrate, tartate, or glycolate. Other zirconium (IV) compounds useful as crosslinking agents include monoalkylammonium, dialkylammonium and trialkylammonium zirconium compounds and the like. For example, a zirconium triethanolamine or diethanolamine complex may be used as the crosslinking agent in this preferred embodiment. A zirconium lactate chelate is the zirconium (IV) crosslinker preferred in formulating the aqueous based zirconium (IV) crosslinked guar fracturing fluid. The zirconium lactate chelate is available from Benchmark Research & Technology, Inc. of Midland, Tex.

A method for formulating the aqueous based zirconium (IV) crosslinked guar fracturing fluid includes the following steps. An aqueous fluid is placed into a suitable mixing device, such as a Waring Blender. Mixing occurs in a fashion well known to those of ordinary skill in the art. A stabilizer is added to the aqueous fluid in an amount from about 1 to about 50 PPTG of the aqueous fluid. The stabilizer is allowed to dissolve into the aqueous fluid for a first predetermined period, which is between approximately 1 and about 20 minutes in this preferred embodiment. A gelling agent, guar gum in this preferred embodiment, as a powder or a suspension in a hydrocarbon or other solvent, is added to the mixture in an amount from about 10 to about 100 PPTG of the aqueous fluid, depending upon the anticipated temperature of the formation to be fractured. The mixture is mixed for a second predetermined period, which is between approximately 1 and about 30 minutes in this preferred embodiment. A alkaline buffer is added to the mixture in quantities sufficient to provide a pH in the range from about 9 to about 12, which is in an amount from about 1 to about 40 PPTG of the aqueous fluid. The mixture is mixed for a third predetermined period, which is between approximately 1 and about 10 minutes. An alpha-hydroxycarboxylic acid delaying agent is added to the mixture in a predetermined amount to control the onset of the crosslink reaction, which is in an amount from about 0.25 to about 3.75 PPTG of the aqueous fluid. The mixture is mixed for a fourth predetermined period, which is between approximately 1 and about 10 minutes, thereby forming a polymer solution. A zirconium crosslinker is added to the polymer solution in an amount sufficient to cause gelation of the polymer solution at a predetermined time, which is in an amount from about 0.1 to about 5 GPTG of the formulated polymer solution. The crosslinker concentration will vary depending upon gelling agent concentration, subterranean formation temperature, buffer concentration, delay additive concentration desired crosslink time, and other factors well known to those of ordinary skill in the art. The mixture is mixed until gelation occurs to produce the fracturing fluid according to this preferred embodiment.

A method for producing a specific formulation of the fracturing fluid according to this preferred embodiment includes the following steps. An aqueous fluid is formulated by placing, for instance, 1000 gallons of water in a suitable mixing device, well known to those of ordinary skill in the art, and stirring in 166.92 pounds of potassium chloride to produce a 2% potassium chloride solution. Sodium thiosulfate pentahydrate is added to the 2% potassium chloride solution in an amount of 30 pounds and allowed to dissolve for a period between approximately 1 and about 20 minutes. A guar powder or suspension of guar powder in hydrocarbon solvent is added to the mixture in an amount such that the final concentration of guar in the fracturing fluid is between about 35 and about 55 PPTG of the aqueous fluid, depending upon the anticipated temperature of the subterranean formation to be fractured. The mixture is mixed for a period between approximately 1 to 30 minutes with sufficient mixing energy to cause the guar to hydrate (i.e., form a viscous solution). A sodium carbonate/bicarbonate blend is added to the mixture in an amount of about 22.5 PPTG of the aqueous fluid to provide a pH in the range from about 9.5 to 10. The mixture is mixed for a period between approximately 1 and 10 minutes. An alpha hydroxycarboxylic acid delaying agent, preferably citric acid, is added to the mixture in an amount of about 1.5 PPTG of the aqueous fluid. The mixture is mixed for a period between approximately 1 and 10 minutes, thereby forming a polymer solution. A zirconium sodium lactate solution is added to the polymer solution in an amount of 0.5 GPTG of the polymer solution, thereby formulating the fracturing fluid. The zirconium sodium lactate has a zirconium content of 1.75% +/−10% as $ZrO_2$ and is commercially available from Benchmark Research & Technology, Inc. of Midland, Tex. under the designation of R16–98. Gelation does not occur immediately, but rather develops only as the temperature of the fracturing fluid is raised.

A fracturing fluid formulated utilizing the above method produces a guar-based fracturing fluid with improved thermal stability over time. Surprisingly, this improved thermal stability results primarily from the order of additions of the fracturing fluid components, wherein the thermal stabilizer is added to the fracturing fluid mixture prior to addition of the guar. The order of additions for the other components of the fracturing fluid may be varied as long as the thermal stabilizer is added to the fracturing fluid mixture prior to the guar. Although the mechanism is not clearly understood, the improved thermal stability also results from the inclusion in the fracturing fluid of the carboxylic acid or the carboxylic acid salt delaying agent. It is thought that the interrelationship between the ligand associated with the zirconium crosslinker and the carboxylate portion of the delaying agent may account for the more optimal performance of the crosslinker in this fracturing fluid system. It is well known to those of ordinary skill in the art that early gelation may contribute to thermal instability of the crosslinked fracturing fluid and that excessive delay in the onset of gelation may cause the treatment to be terminated early due to a proppant "screen-out".

Examples of the improved thermal stability for the fracturing fluid formulated according to the preferred embodiment are illustrated in Tables 1–3. Table 1 illustrates a guar system according to the preferred embodiment compared to a typical derivatized guar system that does not incorporate the preferred embodiment, namely the order of additions of the sodium thiosulfate thermal stabilizer and the alpha-hydroxycarboxylic acid delay agent. The guar system according to the preferred embodiment provides a 4-hour viscosity between 200 and 350 centipoise (cP) at 340° F., whereas the derivatized guar system provides a 4-hour viscosity of 100 cP at the same temperature.

Table 2 illustrates a guar system according to the preferred embodiment wherein the thermal stabilizer is added prior to the guar as opposed to a guar system wherein the thermal stabilizer is added after the guar. The guar system wherein the thermal stabilizer is added prior to the guar provides a 3-hour viscosity of 426 cP, whereas the guar system wherein the thermal stabilizer is added after the guar provides a 3-hour viscosity of 55 cP.

Table 3 illustrates a guar system according to the preferred embodiment including citric acid as a delaying agent as opposed to a guar system without a delaying agent. The guar system including citric acid as a delaying agent provides a 4-hour viscosity of 350 cP, whereas the guar system without a delaying agent provides a 4-hour viscosity of 55 cP. A fracturing fluid formulated without adding the thermal stabilizer prior to the gelling agent and/or without a delaying agent produces a usable fracturing fluid. However, a fracturing fluid formulated by adding the thermal stabilizer prior to the gelling agent and/or with a delaying agent produces a fracturing fluid with significantly greater and desirable, thermal stability over time.

TABLE 1

Comparison of a guar system incorporating the
preferred embodiment with a typical derivatized
guar system without the preferred embodiment

| Component | Guar system @ 340° F. | Derivatized Guar system @ 340° F. |
|---|---|---|
| Polymer/pptg | 55 | 60 |
| Na thiosulfate, pptg | 20 (anhydrous) 30 (pentahydrate) | 30 (pentahydrate) |
| Alkaline Buffer, pptg | 22.5 | 22.5 |
| Crosslinker, gptg | 0.5 | 1.5 |
| Citric acid (25%), gptg | 0.75 | N/A |
| Fumaric acid, pptg | N/A | 1 |
| 4 hr viscosity (cP) @ 40 sec$^{-1}$ | 200–350 | 100 |

TABLE 2

Rheology of Guar system at 340° F.: Effect of order of
addition of stabilizer: 2% KCl, 55 pptg Guar, 20 pptg
sodium thiosulfate (anhydrous), 22.5 pptg alkaline
buffer, 0.75 gptg citric acid (25%), 0.5 gptg
crosslinker. Model 50 Rheometer, B2-R1 bob/rotor.

| Time @ 340° F. | Add stabilizer before guar | Add stabilizer after guar |
|---|---|---|
| 0 | 428 | 1324 |
| 0.5 | 426 | 444 |
| 1.0 | 921 | 203 |
| 1.5 | 586 | 185 |
| 2.0 | 457 | 132 |
| 2.5 | 392 | 117 |
| 3.0 | 426 | 55 |
| 3.5 | 254 | — |
| 4.0 | 207 | — |

TABLE 3

Rheology of Guar system at 340° F.: Effect of citric acid
Formulation: 2% KCl, 55 pptg Guar, 20 pptg sodium thiosulfate
(anhydrous), 22.5 pptg alkaline buffer, 0.75 gptg citric
acid (25%), 0.5 gptg crosslinker. Model 50
Rheometer, B2-R1 bob/rotor.

| Time @ 340° F. (hr) | System + citric acid (cP @ 40 sec$^{-1}$) | System + No citric acid (cP @ 40 sec$^{-1}$) |
|---|---|---|
| 0 | 573 | 1489 |
| 0.5 | 940 | 758 |
| 1.0 | 1038 | 498 |
| 1.5 | 683 | 298 |
| 2.0 | 465 | 286 |
| 2.5 | 302 | 260 |
| 3.0 | 401 | 225 |
| 3.5 | 246 | 276 |
| 4.0 | 350 | 55 |

A method of hydraulically fracturing a subterranean zone penetrated by a wellbore includes the following steps. A fracturing fluid is prepared according to the method described above. The fracturing fluid is pumped into the subterranean zone via the wellbore. The fracturing fluid is permitted to gel after having substantially traversed the well bore or after having entered the subterranean formation, to cause the hydraulic fracturing of the subterranean formation. The method of hydraulically fracturing a subterranean formation penetrated by a wellbore further includes adding proppants to the fracturing fluid and utilizing the fracturing fluid to disperse the proppants throughout the subterranean formation. The method of hydraulically fracturing a subterranean formation penetrated by a wellbore further includes adding a breaker to the fracturing fluid to permit the removal of the fracturing fluid from the subterranean formation.

Although the present invention has been described in terms of the foregoing embodiment, such description has been for exemplary purposes only and, as will be apparent of those of ordinary skill in the art, many alternatives, equivalents, and variations of varying degrees will fall within the scope of the present invention. That scope, accordingly, is not to be limited in any respect by the foregoing description, rather, it is defined only by the claims that follow.

We claim:

1. A high pH aqueous based zirconium (IV) crosslinked guar fracturing fluid suitable for use in wells with bottom-hole static temperatures of 250° F. or greater, comprising:
   a polymer solution, comprising:
      an aqueous fluid,
      natural guar gum,
      a stabilizer,
      a non-delayed alkaline buffer, and
      an alpha-hydroxycarboxylic acid gelation delaying agent; and
   a zirconium (IV) crosslinking agent.

2. The fracturing fluid according to claim 1, wherein the aqueous fluid comprises substantially any aqueous fluid that does not adversely react with one of the constituents of the fracturing fluid, the subterranean formation, and the fluids present therein.

3. The fracturing fluid according to claim 1, wherein the aqueous fluid is selected from the group consisting of fresh water, natural brines, and artificial brines.

4. The fracturing fluid according to claim 3, wherein the artificial brines are selected from the group consisting of potassium chloride solutions and sodium chlorides solutions.

5. The fracturing fluid according to claim 1, wherein the stabilizer comprises any free-radical-scavenging compound.

6. The fracturing fluid according to claim 1, wherein the stabilizer is selected from the group consisting of sodium thiosulfate, thiourea, urea, sodium sulfite, and methanol.

7. The fracturing fluid according to claim 1, wherein the non-delayed alkaline buffer comprises alkaline compounds.

8. The fracturing fluid according to claim 7, wherein the alkaline compounds comprise one or more selected from the group consisting of ammonium and alkaline metal hydroxides, carbonates, and bicarbonates.

9. The fracturing fluid according to claim 8, wherein the alkaline compounds are selected from the group consisting of sodium hydroxide, sodium carbonate, and sodium bicarbonate, and mixtures thereof.

10. The fracturing fluid according to claim 9, wherein the ratio of carbonate to bicarbonate may range from about 8:2 to 2:8.

11. The fracturing fluid according to claim 1, wherein the alpha-hydroxycarboxylic acid gelation delaying agent comprises, an alpha-hydroxycarboxylic acid, the salt of an alpha-hydroxycarboxylic acid, or mixtures thereof.

12. The fracturing fluid according to claim 11, wherein the alpha-hydroxycarboxylic acid or alpha-hydroxycarboxylic acid salts is selected from the group consisting of citric acid, malic acid, glycolic acid, lactic acid, tartaric acid, gluconic acid, glyceric acid, mandelic acid, their salts and mixtures thereof.

13. The fracturing fluid according to claim 1, wherein the alpha-hydroxycarboxylic acid gelation delaying agent comprises an ammonium, amine, or alkali metal salt of an alpha-hydroxycarboxylic acid.

14. The fracturing fluid according to claim 13, wherein the ammonium, amine, or alkali metal salt of an alpha-hydroxycarboxylic acid is selected from the group consisting of sodium citrate and ammonium lactate.

15. The fracturing fluid according to claim 1, wherein the zirconium (IV) crosslinking agent comprises any zirconium compound capable of solubilizing in an aqueous polymer solution to release the metal so that gelation takes place under controlled conditions.

16. The fracturing fluid according to claim 1, wherein the zirconium (IV) crosslinking agent is selected from the group consisting of an aqueous solution of a zirconium alpha-hydroxycarboxylic acid salt.

17. The fracturing fluid according to claim 16, wherein the zirconium alpha-hydroxycarboxylic acid salt crosslinking agent is selected from the group consisting of zirconium ammonium lactate, zirconium di or tri ethanolamine lactate, zirconium diisopropylamine lactate, and zirconium sodium lactate salts.

18. The fracturing fluid according to claim 16, wherein the complex of zirconium and an alpha-hydroxycarboxylic acid is selected from the group consisting of aqueous solutions of zirconium citrate, zirconium tartate, and zirconium glycolate.

19. The fracturing fluid according to claim 1, wherein the zirconium (IV) crosslinking agent is selected from the group consisting of monoalkylammonium zirconium compounds, dialkylammonium zirconium compounds, and trialkylammonium zirconium compounds.

20. The fracturing fluid according to claim 1, wherein the zirconium (IV) crosslinking agent is selected from the group consisting of a zirconium triethanolamine complex and a diethanolamine complex.

21. A method for formulating an aqueous based zirconium (IV) crosslinked guar fracturing fluid having a pH from about 9 to about 12, comprising:
    placing an aqueous fluid into a suitable mixing device;
    adding a stabilizer to the aqueous fluid in an amount from about 1 PPTG to about 50 PPTG of the aqueous fluid;
    allowing the stabilizer to dissolve into the aqueous fluid for a first predetermined period;
    adding natural guar gum to the mixture in an amount from about 10 PPTG to about 100 PPTG of the aqueous fluid;
    mixing the mixture for a second predetermined period;
    adding a non-delayed alkaline buffer to the mixture in an amount from about 1 PPTG to about 40 PPTG of the aqueous fluid;
    mixing the mixture for a third predetermined period;
    adding an alpha-hydroxycarboxylic acid gelation delaying agent to the mixture in an amount from about 0.25 PPTG to about 3.75 PPTG of the aqueous fluid;
    mixing the mixture for a fourth predetermined period, thereby forming a polymer solution;
    adding a zirconium (IV) crosslinking agent in an amount from about 0.1 PPTG to about 5 PPTG of the formulated polymer solution; and
    mixing until gelation occurs, thereby producing the fracturing fluid.

22. The method according to claim 21, wherein the aqueous fluid comprises substantially any aqueous fluid that does not adversely react with one of the constituents of the fracturing fluid, the subterranean formation, and the fluids present therein.

23. The method according to claim 21, wherein the aqueous fluid is selected from the group consisting of fresh water, natural brines, and artificial brines.

24. The method according to claim 23, wherein the artificial brines are selected from the group consisting of such as potassium chloride solutions and sodium chlorides solutions.

25. The method according to claim 21, wherein the stabilizer comprises any free-radical-scavenging compound.

26. The method according to claim 21, wherein the stabilizer is selected from the group consisting of sodium thiosulfate, thiourea, urea, sodium sulfite, and methanol.

27. The method according to claim 21, wherein the non-delayed alkaline buffer comprises alkaline compounds.

28. The method according to claim 27, wherein the alkaline compounds comprise one or more selected from the group consisting of ammonium and alkaline metal hydroxides, carbonates, and bicarbonates.

29. The method according to claim 28, wherein the alkaline compounds are selected from the group consisting of sodium hydroxide, sodium carbonate, and sodium bicarbonate, and mixtures thereof.

30. The method according to claim 21, wherein the alpha-hydroxycarboxylic acid elation delaying agent comprises an alpha-hydroxycarboxylic acid, the salt of an alpha-hydroxycarboxylic acid, or mixtures thereof.

31. The method according to claim 30, wherein the alpha-hydroxycarboxylic acid or alpha-hydroxycarboxylic acid salt is selected from the group consisting of citric acid, malic acid, glycolic acid, lactic acid, tartaric acid, gluconic acid, glyceric acid, mandelic acid, their salts and mixtures thereof.

32. The method according to claim 21, wherein the alpha-hydroxycarboxylic acid Relation delaying agent comprises an ammonium, amine, or alkali metal salt of an alpha-hydroxycarboxylic acid.

33. The method according to claim 32, wherein the ammonium, amine, or alkali metal salt of an alpha-hydroxycarboxylic acid is selected from the group consisting of sodium citrate and ammonium lactate.

34. The method according to claim 21, wherein the zirconium (IV) crosslinking agent comprises any zirconium compound capable of solubilizing in an aqueous polymer solution to release the metal so that gelation takes place under controlled conditions.

35. The method according to claim 21, wherein the zirconium (IV) crosslinking agent is selected from the group consisting of an aqueous solution of a zirconium alpha-hydroxycarboxylic acid salt.

36. The method according to claim 35, wherein the zirconium alpha-hydroxycarboxylic acid salt crosslinking agent is selected from the group consisting of zirconium ammonium lactate, zirconium di or tri ethanol amine lactate, zirconium diisopropylamine lactate, and zirconium sodium lactate salts.

37. The method according to claim 35, wherein the complex of zirconium and an alpha-hydroxycarboxylic acid is selected from the group consisting of aqueous solutions of zirconium citrate, zirconium tartate, and zirconium glycolate.

38. The method according to claim 21, wherein the zirconium (IV) crosslinking agent is selected from the group consisting of monoalkylammonium zirconium compounds, dialkylammonium zirconium compounds, and trialkylammonium zirconium compounds.

39. The method according to claim 21, wherein the zirconium (IV) crosslinking agent is selected from the group consisting of a zirconium triethanolamine complex and a diethanolamine complex.

40. A method of hydraulically fracturing a subterranean zone penetrated by a wellbore, comprising:

preparing an aqueous based zirconium (IV) crosslinked guar fracturing fluid having a pH from about 9 to about 12, comprising:
  a polymer solution, comprising:
    an aqueous fluid,
    natural guar gum in an amount from about 10 PPTG to about 100 PPTG of the aqueous fluid,
    a stabilizer in an amount from about 1 PPTG to about 50 PPTG of the aqueous fluid,
    a non-delayed alkaline buffer in an amount from about 1 PPTG to about 40 PPTG of the aqueous fluid, and
    an alpha-hydroxycarboxylic acid gelation delaying agent in an amount from about 0.25 PPTG to about 3.75 PPTG of the aqueous fluid, and
  a zirconium (IV) crosslinking agent in an amount from about 0.1 PPTG to about 5 PPTG of the polymer solution;
  pumping the fracturing fluid into the subterranean zone via the wellbore;
  permitting the fracturing fluid to gel after having substantially traversed the well bore or after having entered the subterranean formation, thereby causing hydraulic fracturing of the subterranean formation.

41. The method according to claim 40, further comprising the steps of:
  adding proppants to the fracturing fluid; and
  utilizing the fracturing fluid to disperse the proppants throughout the subterranean formation.

42. The method according to claim 40, further comprising the step of adding a breaker to the fracturing fluid to permit the removal of the fracturing fluid from the subterranean formation.

43. The method according to claim 40, wherein the aqueous fluid comprises substantially any aqueous fluid that does not adversely react with one of the constituents of the fracturing fluid, the subterranean formation, and the fluids present therein.

44. The method according to claim 40, wherein the aqueous fluid is selected from the group consisting of fresh water, natural brines, and artificial brines.

45. The method according to claim 44, wherein the artificial brines are selected from the group consisting of such as potassium chloride solutions and sodium chlorides solutions.

46. The method according to claim 40, wherein the stabilizer comprises any free-radical-scavenging compound.

47. The method according to claim 40, wherein the stabilizer is selected from the group consisting of sodium thiosulfate, thiourea, urea, sodium sulfite, and methanol.

48. The method according to claim 40, wherein the non-delayed alkaline buffer comprises alkaline compounds.

49. The method according to claim 48, wherein the alkaline compounds comprise one or more selected from the group consisting of ammonium and alkaline metal hydroxides, carbonates, and bicarbonates.

50. The method according to claim 48, wherein the alkaline compounds are selected from the group consisting of sodium hydroxide, sodium carbonate, and sodium bicarbonate, and mixtures thereof.

51. The method according to claim 40, wherein the alpha-hydroxycarboxylic acid gelation delaying agent comprises an alpha-hydroxycarboxylic acid, the salt of an alpha-hydroxycarboxylic acid, or mixtures thereof.

52. The method according to claim 51, wherein the alpha-hydroxycarboxylic acid or alpha-hydroxycarboxylic acid salt is selected from the group consisting of citric acid, malic acid, glycolic acid, lactic acid, tartaric acid, gluconic acid, glyceric acid, mandelic acid, their salts and mixtures thereof.

53. The method according to claim 40, wherein the alpha-hydroxycarboxylic acid gelation delaying agent comprises an ammonium, amine, or alkali metal salt of an alpha-hydroxycarboxylic acid.

54. The method according to claim 40, wherein the ammonium, amine, or alkali metal salt of an alpha-hydroxycarboxylic acid is selected from the group consisting of sodium citrate and ammonium lactate.

55. The method according to claim 40, wherein the zirconium (IV) crosslinking agent comprises any zirconium compound capable of solubilizing in an aqueous polymer solution to release the metal so that gelation takes place under controlled conditions.

56. The method according to claim 40, wherein the zirconium (IV) crosslinking agent is selected from the group consisting of an aqueous solution of a zirconium alpha-hydroxycarboxylic acid salt.

57. The method according to claim 56, wherein the zirconium alpha-hydroxycarboxylic acid salt crosslinking agent is selected from the group consisting of zirconium ammonium lactate, zirconium di or tri ethanolamine lactate, zirconium diisopropylamine lactate, and zirconium sodium lactate salts.

58. The method according to claim 56, wherein the complex of zirconium and an alpha-hydroxycarboxylic acid is selected from the group consisting of aqueous solutions of zirconium citrate, zirconium tartate, and zirconium glycolate.

59. The method according to claim 40, wherein the zirconium (IV) crosslinking agent is selected from the group consisting of monoalkylammonium zirconium compounds, dialkylammonium zirconium compounds, and trialkylammonium zirconium compounds.

60. The method according to claim 40, wherein the zirconium (IV) crosslinking agent is of a zirconium triethanolamine complex and a diethanolamine complex.

\* \* \* \* \*